United States Patent Office 3,392,163
Patented July 9, 1968

3,392,163
PROCESS FOR THE PREPARATION OF BARIUM LIGNIN SULPHONATES
Robert E. Barnwell, Erie, and Norman F. Marshall, Ridgway, Pa., assignors to Robeson Process Company, Erie, Pa., a corporation of New Jersey
No Drawing. Continuation-in-part of application Ser. No. 234,525, Oct. 31, 1962. This application May 3, 1965, Ser. No. 452,866
7 Claims. (Cl. 260—124)

ABSTRACT OF THE DISCLOSURE

Process for the preparation of barium lignin sulfonate, barium calcium lignin sulfonate and barium calcium magnesium lignin sulfonate comprising neutralizing spent sulfite liquor with calcium or magnesium hydroxide, separating the precipitate formed, concentrating the clear liquor remaining after separation of the precipitate, treating said liquor with sulfuric acid to precipitate insoluble sulfates, and adding barium hydroxide.

---

This is a continuation-in-part of patent application, No. 234,525, filed Oct. 31, 1962.

This invention relates to the manufacture of ceramics and is chiefly concerned with the improvement in the finished quality of structural clay products; for example, building bricks (both clay and shale), glazed structural bricks, hollow structural tile, drain tile, barn tile, sewer pipe, etc.

Structural clay products such as ceramic brick, tile, pipe, and the like have been manufactured by molding and burning wet clay since time immemorial. More recently, it has become common practice to mix clay and water in a pug mill prior to molding and burning. The amount of water to be added to the clay is determined by the superintendent, to give the desired plastic or slump characteristic to clay for molding purposes. The amount of water is added to the clay to give it the desired plasticity for the particular process.

Additions of organic binders, such as calcium ligno-sulphonate, to mix in the pug mill to control the green or wet strength plasticity and burned strength, have become common. The inventors' licensee has been selling lignin sulphonates to the ceramic industry to be used as a binder for more than forty years. The amounts of lignin sulphonates to be added to the clay-water mixture are well established through the industry. This amount of lignin sulphonate is generally 0.1% to 3% of the powdered lignin sulphonate based on the weight of the raw materials or clay on a dry basis and 0.1% to 5% of the liquid materials. This percentage of binder addition has become general practice throughout the industry.

It is also common practice to add barium carbonate (a dry water insoluble powder) to the clay-water mixture in a pug mill or mixer for the purpose of reducing or eliminating scumming on the surface of the burned or vitrified finished product. Deposition of soluble salts on the surface of the burned or vitrified finished product is known as scumming.

By the addition of barium to the clay, water, etc. in the pug mill or mixer, the soluble sulphites and sulphates are precipitated as insoluble barium salts. This prevents migration of the soluble sulphite or sulphate salts to the surface of the clay products during the drying and burning operations.

The present invention has for its principal object the prevention of having bases present in the finished product which would form objectionable sulphite or sulphate salts or compounds such as sodium or ammonia.

Another object of the invention is the addition of soluble barium salts such as barium lignin sulphonic sulphonate or barium lignin sulphonate which will readily dissolve in the water addition to the clay mixture in a pug mill or mixer. The barium lignin salts, being in solution in the water addition, give uniform distribution of the barium throughout the clay mixture. The above has advantages of improved strength of the clay product, both in the unfired and fired state, reduction in losses during manufacture, and sharper edges on the finished products.

This invention also relates to the manufacture of a barium lignin sulphonate or mixtures of barium, calcium, magnesium lignin sulphonates or soluble bases in combination with barium combined as lignin sulphonates. The lignin sulphonic acids and lignin sulphonates are produced as a sulphite spent liquor from a sulphite process in which wood chips are cooked with a solution containing as its effective constituents calcium and magnesium or mixtures of calcium and magnesium bisulphite together with an excess of free sulphurous acid.

For example, the spent sulphite liquor may be the spent sulphite liquor from any neutral or acidic sulphite process for producing wood pulp. The barium lignin sulphonate is produced by exchange of the bases present in the spent sulphite liquor as received from the pulp mill blow pits.

In an example of the process disclosed, the spent acid sulphite liquor is neutralized with calcium hydroxide or with mixtures of calcium and magnesium hydroxides settled or filtered to remove the insolubles or precipitated matter and then evaporated or concentrated to a solids content of from fifty and five-tenths percent (50.5%) to fifty-five percent (55%) total solids. It is then treated at a temperature of from one hundred forty degrees Fahrenheit (140° F.) to two hundred degrees Fahrenheit (200° F.) with dilute sulphuric acid (fifty percent to seventy percent $H_2SO_4$), or sufficient to precipitate the calcium as calcium sulphate to the desired pH and residual calcium content of the treated liquor, after which the treated liquor is filtered to remove the precipitated calcium sulphate. The filtered acid liquor is then substantially neutralized with barium hydroxide, giving the barium calcium or barium calcium magnesium lignin sulphonates.

If the finished product is desired as an acid product instead of a neutral product, the acidity can be controlled to the desired pH by buffering the acid liquor with barium hydroxide with the pH range of 2.5 to 7.00 pH.

The finished liquid barium calcium or barium magnesium lignin sulphonate, having a total solids content of from forty-five to fifty-five percent, can be spray dried and produced as a dry powdered material having a total moisture content of from one percent to five percent, thus being made available to the trade in both liquid and powdered form.

Lignin sulphonic sulphonates or lignin sulphonates are known to have dispersing and wetting out properties. It has been found that the surface tension of a one-tenth of one percent solution of the above acid salts or neutral salts on a solids basis in boiled distilled water at 25° C. is from 48 dynes per centimeter to 58 dynes per centimeter. Boiled distilled water at 25° C. under the same atmospheric conditions is 73.5 dynes per centimeter.

It has been discovered by actual factory experience that the addition of water soluble barium lignin sulphonates to the clay as mixed in the pug mill or mixers, in addition to giving wet or green strength to the clay bodies as produced for the manufacture of brick, tiles, and other structural clay products, will also precipitate soluble sulphite and sulphate to insoluble barium salts which, in turn, will prevent migration of the sulphite or sulphate salts to the surface of the clay body. This prevents or reduces the scumming on the surface of the burned or vitrified finished product.

It has also been found that the addition of water soluble barium lignin sulphonates to the clay as mixed in the pug mill or mixers will give uniform distribution of the barium throughout the entire mass as from the pug mill or mixers, resulting in the reduction or elimination of the amount of barium carbonate normally added to clay in the pug mill or mixers. Barium carbonate may be added to the pug mill or mixers as a dry powder or as a slurry. It may be added in excess over the amount of barium actually needed due to conditions preventing complete reaction, such as uneven distribution and particles being clay coated.

The barium, when added as barium lignin sulphonate, is in a dissolved state and is added with the regular water addition, giving uniform dispersion and distribution, resulting in the reduction of the actual amount of barium required to prevent scumming.

The present invention will be more clearly understood from a consideration of the following specific examples which are given for the purpose of illustration and are not intended to limit the scope of the invention in any way.

EXAMPLE I

Range of barium in finished product dependent upon amount of $H_2SO_4$ added and Ca removed.
2.6 pH—4.0% to 5.0% $H_2SO_4$ wt. H.L.
6.00% to 6.80% barium monohydrate to 7.00 pH
4.00% to 5.60% BaO to 7.00 pH
If all Ca removed (3.5% CaO) = 6.50% $H_2SO_4$
8.5% to 9.0% barium monohydrate to pH 7.00
6.8% to 7.4% BaO to pH 7.00

EXAMPLE II

Clay and water to a pug mill in proportions determined by the superintendent to give the desired plasticity.
Add barium lignin sulphonate as an organic binder in the generally accepted percentage for organic binders in ceramic clay products.
Add 0.1% to 3% of barium lignin sulphonate based on the weight of the raw materials or clay on a dry basis or 0.1% to 5% of the liquid materials.
Mold and dry.

EXAMPLE III

Clay and water to a pug mill in proportions determined by the superintendent to give the desired plasticity.
Add barium lignin sulphonic sulphonate as an organic binder in the generally accepted percentage for organic binders in ceramic clay products.
Add 0.1% to 3% of barium lignin sulphonic sulphonate based on the weight of the raw materials or clay on a dry basis or 0.1% to 5% of the liquid materials.
Mold and dry.

Considerable modification is possible in the selection of the various ingredients and amounts thereof as well as in the particular procedures followed in preparing moldable ceramic mixes and in making ceramic bodies without departing from the scope of the present invention.

The embodiments of the invention in which an exclusive property or privilege is claimed are defined as follows:

1. Process for the preparation of barium calcium lignin sulfonate and barium calcium magnesium lignin sulfonate comprising neutralizing spent sulfite liquor with an alkaline earth metal hydroxide selected from the group consisting of calcium and magnesium, and mixtures thereof, filtering the precipitate formed from the liquor, concentrating the clear liquor remaining after separation of the precipitate to from 50.5% to 55% solids content, treating said liquor at a temperature of 140° F. to 200° F. with 50 to 70% sulfuric acid to precipitate insoluble sulfates from said liquor, filtering said precipitate from said liquor and adding barium hydroxide to the filtrate.

2. Process of claim 1 in which said alkaline earth metal hydroxide is calcium hydroxide.

3. Process of claim 1 in which said alkaline earth metal hydroxide is magnesium hydroxide.

4. Process of claim 1 in which said alkaline earth metal hydroxide is a mixture of calcium and magnesium hydroxides.

5. Process of claim 1 in which said filtrate is substantially neutralized with barium hydroxide.

6. Process of claim 1 in which barium hydroxide is added to produce a pH of from 2.5 to 7.

7. Process of claim 1 in which said filtrate is spray dried.

References Cited

UNITED STATES PATENTS

| | | | |
|---|---|---|---|
| 1,764,601 | 6/1930 | Baker et al. | 260—124 |
| 2,371,136 | 3/1945 | Harmon | 260—124 |

OTHER REFERENCES

Johnson et al.: "Utilization of Waste Sulphite Liquor," p. 15 (1919).

CHARLES B. PARKER, *Primary Examiner.*

D. R. PHILLIPS, *Assistant Examiner.*